(12) United States Patent
Wang et al.

(10) Patent No.: US 11,258,933 B2
(45) Date of Patent: Feb. 22, 2022

(54) LIGHT SOURCE MODULE AND DISPLAY MODULE

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Yangbing Li, Beijing (CN); Yapeng Li, Beijing (CN); Likai Deng, Beijing (CN); Yuanyuan Ma, Beijing (CN); Xueyou Cao, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/652,661

(22) PCT Filed: Oct. 11, 2019

(86) PCT No.: PCT/CN2019/110600
§ 371 (c)(1),
(2) Date: Mar. 31, 2020

(87) PCT Pub. No.: WO2020/140532
PCT Pub. Date: Jul. 9, 2020

(65) Prior Publication Data
US 2021/0160409 A1 May 27, 2021

(30) Foreign Application Priority Data
Jan. 2, 2019 (CN) .......................... 201910003083.2

(51) Int. Cl.
H04N 5/225 (2006.01)
H04N 13/254 (2018.01)
G02F 1/13357 (2006.01)

(52) U.S. Cl.
CPC ..... *H04N 5/2257* (2013.01); *G02F 1/133603* (2013.01); *H04N 5/2254* (2013.01); *H04N 13/254* (2018.05)

(58) Field of Classification Search
CPC .. H04N 5/2257; H04N 5/2254; H04N 13/254; G02F 1/133603
See application file for complete search history.

(56) References Cited

U.S. PATENT DOCUMENTS 10,678,043 B2 6/2020 Ding et al.
2011/0050639 A1 3/2011 Challener et al.
(Continued)

FOREIGN PATENT DOCUMENTS

CN 2466703 Y 12/2001
CN 105763779 A 7/2016
(Continued)

OTHER PUBLICATIONS

Office Action issued in corresponding Chinese Patent Application No. 201910003083.2, dated Apr. 14, 2020.

*Primary Examiner* — Nasim N Nirjhar
(74) *Attorney, Agent, or Firm* — McDermott Will & Emery LLP

(57) ABSTRACT

A light source module and a display module are provided. The light source module includes: a substrate; a plurality of first light sources spaced on the substrate, each of the plurality of first light sources being configured to emit visible light; a depth sensor on the substrate; and a first blocking member configured to shield visible light but transmit invisible light. The depth sensor includes a second light source configured to emit invisible light and a light receiving member configured to sense invisible light, an orthographic projection of the second light source on the substrate is located within an orthographic projection of a gap between two adjacent first light sources on the substrate, (Continued)

an orthographic projection of the first blocking member on the substrate at least partially covers the orthographic projection of the second light source on the substrate.

19 Claims, 10 Drawing Sheets

(56) References Cited

U.S. PATENT DOCUMENTS

| | | | |
|---|---|---|---|
| 2014/0168574 A1 | 6/2014 | Matsubara | |
| 2014/0316916 A1* | 10/2014 | Hay | A47F 9/048 |
| | | | 705/17 |
| 2018/0288388 A1* | 10/2018 | Hicks | H04N 13/296 |
| 2019/0014291 A1* | 1/2019 | Siminoff | H04M 1/0291 |
| 2019/0086659 A1 | 3/2019 | Ding et al. | |
| 2019/0346939 A1* | 11/2019 | Na | G06F 3/0421 |
| 2020/0058625 A1* | 2/2020 | Chen | H01L 33/58 |

FOREIGN PATENT DOCUMENTS

| | | |
|---|---|---|
| CN | 107422571 A | 12/2017 |
| CN | 107992163 A | 5/2018 |
| CN | 108616618 A | 10/2018 |
| CN | 108734134 A | 11/2018 |
| CN | 108960196 A | 12/2018 |
| CN | 109581747 A | 4/2019 |

\* cited by examiner

LIGHT SOURCE MODULE AND DISPLAY MODULE

CROSS-REFERENCE TO RELATED APPLICATION

This application is a Section 371 National Stage Application of International Application No. PCT/CN2019/110600, filed on Oct. 11, 2019 and entitled "LIGHT SOURCE MODULE AND DISPLAY MODULE", and claims priority to Chinese Application No. 201910003083.2, filed on Jan. 2, 2019, the contents of which are incorporated herein by reference in their entirety.

TECHNICAL FIELD

Embodiments of the present disclosure relate to the field of light source technology and the field of display technology, and in particular, to a light source module and a display module including the light source module.

BACKGROUND

In recent years, with the development of technology, a display device such as a mobile phone is gradually developed in such a way that various sensors are integrated thereon. The sensors are configured to collect various information for use by the display device.

Meanwhile, with the development of 3D technology, the application of technology in stereo display, machine vision, satellite remote sensing, etc. increasingly requires to obtain depth information of a scene. For example, a depth camera can acquire depth information of a target within the camera's field of view.

SUMMARY

According to the embodiments of the present disclosure, there are provided a light source module and a display module including the light source module.

In one aspect, there is provided a light source module, comprising:
  a substrate;
  a plurality of first light sources spaced on the substrate, each of the plurality of first light sources being configured to emit visible light;
  a depth sensor on the substrate; and
  a first blocking member configured to shield visible light but transmit invisible light,
  wherein the depth sensor comprises a second light source configured to emit invisible light and a light receiving member configured to sense invisible light, an orthographic projection of the second light source on the substrate is located within an orthographic projection of a gap between two adjacent first light sources on the substrate, an orthographic projection of the first blocking member on the substrate at least partially covers the orthographic projection of the second light source on the substrate.

According to some embodiments of the present disclosure, the second light source is disposed in the gap between the two adjacent first light sources.

According to some embodiments of the present disclosure, an orthographic projection of the light receiving member on the substrate is located within the orthographic projection of the gap between the two adjacent first light sources on the substrate.

According to some embodiments of the present disclosure, the light receiving member is located in the gap between the two adjacent first light sources.

According to some embodiments of the present disclosure, the depth sensor further comprises a lens disposed at a side of the light receiving member away from the substrate, the light receiving member is spaced from the lens in a direction perpendicular to the substrate, and an orthographic projection of the lens on the substrate at least partially overlaps with an orthographic projection of the light receiving member on the substrate.

According to some embodiments of the present disclosure, the light source module further comprises an optical film layer disposed at a side of the first light sources and the second light source away from the substrate, wherein the optical film layer comprises at least one of a diffusion sheet, a fluorescent layer, or a prism.

According to some embodiments of the present disclosure, the lens is disposed at a side of the optical film layer adjacent to the substrate.

According to some embodiments of the present disclosure, the lens is disposed at a side of the optical film layer away from the substrate.

According to some embodiments of the present disclosure, the lens comprises a first side facing the light receiving member, and the first blocking member is disposed at sides of the lens other than the first side.

According to some embodiments of the present disclosure, the lens comprises a second side away from the light receiving member, and the first blocking member is disposed at sides of the lens other than the second side.

According to some embodiments of the present disclosure, the light source module further comprises a second blocking member configured to shield visible light but transmit invisible light, and disposed at a side of the light receiving member adjacent to the first light sources.

According to some embodiments of the present disclosure, the plurality of first light sources comprise light emitting diodes.

According to some embodiments of the present disclosure, the light emitting diodes comprise micro light emitting diodes and/or mini light emitting diodes.

According to some embodiments of the present disclosure, the first light sources, the second light source and the light receiving member are all located on a same side of the substrate.

According to some embodiments of the present disclosure, the substrate is a glass substrate.

According to some embodiments of the present disclosure, the first light sources and the second light source are disposed on one side of the substrate, and the light receiving member is disposed on the other side of the substrate away from the first light sources and the second light source.

According to some embodiments of the present disclosure, the substrate is a printed circuit board.

According to some embodiments of the present disclosure, the light receiving member is disposed in a peripheral region of the substrate.

According to some embodiments of the present disclosure, the second light source is configured to emit infrared light, and the light receiving member is configured to sense infrared light.

In another aspect, there is provided a display module, comprising the light source module according to any one of the above embodiments.

In yet another aspect, there is provided a display module, comprising:

the light source module according to any one of claims 1-4 and 18; and a display panel on a light emitting side of the light source module, the display panel comprising:
an array substrate;
a color filter substrate opposite to the array substrate; and
a liquid crystal layer between the array substrate and the color filter substrate, the liquid crystal layer comprising a first portion, an orthographic projection of the light receiving member on the substrate coinciding with an orthographic projection of the first portion of the liquid crystal layer on the substrate,
wherein the first portion of the liquid crystal layer is configured in such a way that the first portion of the liquid crystal layer is deflected to form a lens in response to a depth imaging signal, so that light is focused on the light receiving member.

BRIEF DESCRIPTION OF THE DRAWINGS

Other objectives and advantages of the present disclosure, and a comprehensive understanding of the present disclosure will be apparent from the following description of the embodiments of the present disclosure with reference to the accompanying drawings.

Figure 1:
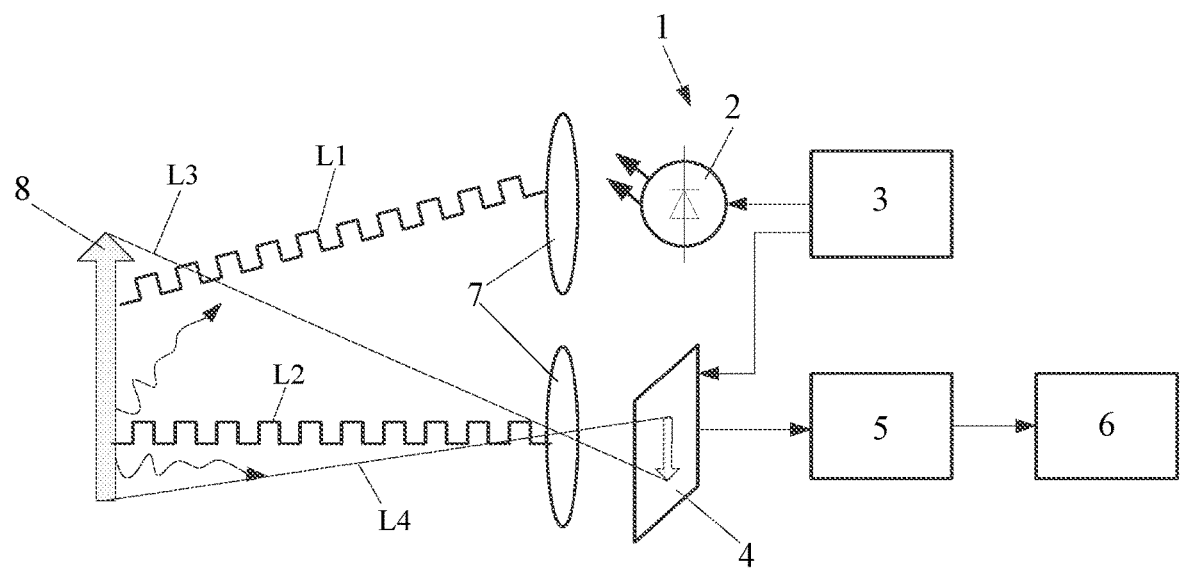
FIG. 1 is a block diagram of a depth sensor based on a TOF measurement method.

It should be noted that, for the sake of clarity, the dimensions of layers, structures or areas may be enlarged or reduced in the drawings for describing the embodiments of the present disclosure, that is, these drawings are not drawn to actual scale.

DETAILED DESCRIPTION OF EMBODIMENTS

The technical solutions of the present disclosure will be further described in detail below with reference to the embodiments in combination with the accompanying drawings. In the description, the same or similar reference numerals indicate the same or similar components. The following description of the embodiments of the present disclosure with reference to the accompanying drawings is intended to explain the general concept of the present disclosure, but should not be construed as a limitation to the present disclosure.

In addition, in the following detailed description, for ease of explanation, many specific details are set forth to provide a comprehensive understanding of the embodiments of the present disclosure. However, it is obvious that one or more embodiments may be practiced without these specific details.

It should be noted that the expressions "on", "formed on" and "disposed on" described herein may mean that one layer is directly formed or provided on another layer, or that one layer is indirectly formed or provided on another layer, that is, there are other layers between the two layers.

It should be noted that although the terms "first", "second" and so forth may be used herein to describe various components, members, elements, regions, layers, and/or parts, these components, members, elements, regions, layers, and/or parts should not be limited by these terms. Rather, these terms are intended to distinguish one component, member, element, region, layer, and/or part from another one. Thus, for example, the first component, the first member, the first element, the first region, the first layer, and/or the first part discussed below may be referred to as a second component, a second member, a second element, a second region, a second layer, and/or a second part, without departing from the teaching of the present disclosure.

In this specification, "sensor" may refer to a device that can detect a state of an object and convert the detection result into a corresponding electrical signal. Herein, some sensors can also transmit corresponding electrical signals to a variety of external circuits. For example, the sensors may include a light sensor, a temperature sensor, a pressure sensor, a magnetic sensor, a distance sensor or a depth sensor, and the like.

In this specification, "depth sensor" may refer to a type of sensors (as a state type) that can detect a position (or a relative position, for example, a distance between the sensor and an object) of an object. The depth sensor may be used to detect a state of the object with respect to a specific range of electromagnetic signals (for example, microwave signals, visible light signals, infrared signals, ultrasound signals, etc.). In some applications, the depth sensor is associated with a "source" that sends (or emits) a "source signal" or distance measuring signal toward the object, the object can reflect a portion of the source signal, and the reflected portion of the source signal may be detected by the depth sensor. For example, the depth sensor may use a time of flight (TOF) measurement method, a structured light technology, or a binocular visible light technology to measure the depth (or range or distance) between the object and the sensor.

In this specification, "micro light emitting diodes (also known as micro LEDs)" may refer to a light emitting diode formed by miniaturizing LEDs and establishing a matrix of LEDs (light emitting diodes). For example, LED backlight sources may be thinned, miniaturized and the matrix of LED backlight sources may be established, then the size of a single LED may be less than 100 μm, or even less than 50 μm. Similar to an OLED (Organic Light Emitting Diode) display, a display using micro LEDs can realize individual addressing and individually-driven light emission (self-emission) for each pixel. "Mini light emitting diode (also known as mini LED, or sub-millimeter light emitting diode)" may refer to a light emitting diode with a size between 100 μm and 300 μm, or a size about 100 μm, which is between the conventional LED and micro LED.

In the conventional depth camera, the chip of the photosensitive sensor is too large, which makes it difficult to achieve miniaturization of the depth sensor. Therefore, it is difficult to integrate the conventional depth camera with a screen of a display device.

FIG. 1 is a block diagram of a depth sensor based on a TOF (Time of Flight) measurement method. For example, the working principle of the TOF measurement method is as follows: a beam of illumination light is emitted, the illumination light is reflected by an object and then received by a light receiving member, and then a distance measurement is achieved by using a phase change between the transmitted light wave signal and the reflected light wave signal. As shown in FIG. 1, the depth sensor 1 may include a light source 2, a modulator circuit 3, a light receiving member 4, a demodulator circuit 5, and a calculation circuit 6. The light source 2 may be an infrared light emitter for emitting infrared light. For example, the light source 2 may be a light emitting diode. The light receiving member 4 may be a silicon-based image sensor. For example, the light receiving member 4 may include photosensitive sensors such as CMOS sensors arranged in an array. In order to realize the emission and convergence of light, an optical component 7 such as a lens is further provided between the depth sensor 1 and an object 8.

In operation, the light source 2 emits a beam of infrared light modulated by the modulator circuit 3, for example, a square waveform signal shown in FIG. 1 (in other embodiments, a continuous wave signal may be used), the light is irradiated to the object 8 through the optical component 7, for example as shown by light beam L1 in FIG. 1; the light beam L1 is reflected by the object 8 to form a light beam L2, the light beam L2 is received by the light receiving member 4 after converged by the optical component 7; the demodulator circuit 5 performs demodulation to the modulated light beam L1 and the modulated light beam L2, to extract information such as phase information; then, the calculation circuit 6 calculates a distance between the light source 2/the light receiving member 4 and the object 8 based on the extracted information such as phase information.

It should be noted that, a specific depth sensor has a certain field of view, for example, a region surrounding the object 8, a region where the light beam L1 emitted from the light source 2 may be actually received, and/or a region where the signal may be actually received or detected by the light receiving member 4 may be referred to as a "field of view". For example, as shown in FIG. 1, the region jointly defined by the lines L3, L4, and the object 8 may be referred to as the field of view of the depth sensor 1. The reflected light beam outside the field of view cannot be received by the light receiving member 4.

Figure 2A:
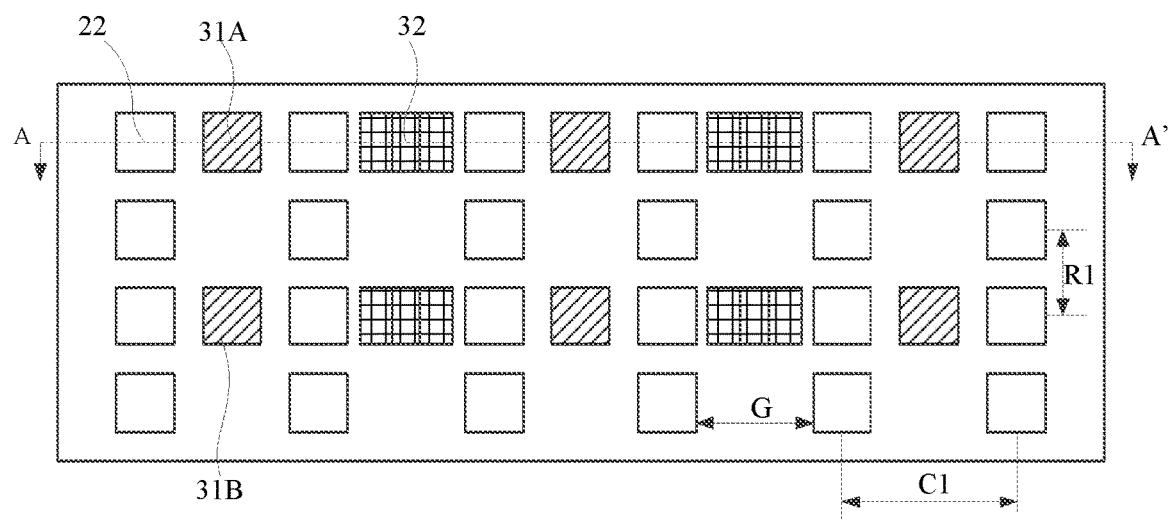
FIG. 2A is a plan view of a light source module according to an embodiment of the present disclosure.
Figure 2B:
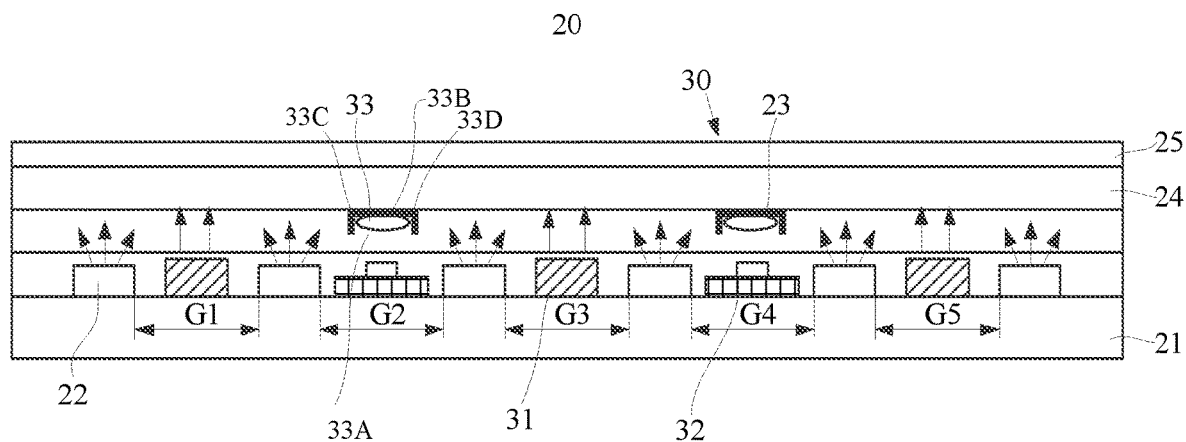
FIG. 2B is a cross-sectional view of the light source module in FIG. 2A taken along a section AA' according to the embodiment of the present disclosure.

FIG. 2A is a plan view of a light source module according to an embodiment of the present disclosure, and FIG. 2B is a cross-sectional view of the light source module in FIG. 2A taken along a section line AA' according to the embodiment of the present disclosure. It should be noted that, in order to show planar positional relationship between various light sources in the light source module and the light source/the light receiving member of the depth sensor, some components are omitted in FIG. 2A, for example, some layers above the light sources are omitted. As shown in FIGS. 2A and 2B, the light source module 20 according to the embodiment of the present disclosure may include a substrate 21, a plurality of first light sources 22 disposed on the substrate 21, and a depth sensor 30 disposed on the substrate 21. The substrate 21 may be a circuit board (for example, PCB (printed circuit board) or FPC (flexible printed circuit)) or a glass substrate. The first light sources 22 may be light sources for emitting visible light. For example, the first light sources 22 may be light emitting diodes (abbreviated as LEDs). Specifically, the first light sources 22 may be mini light emitting diodes (mini LEDs). The plurality of first light sources 22 may be spaced on the substrate 21, as shown in FIG. 2A, the plurality of first light sources 22 are arranged on the substrate 21 in an array. Each row of first light sources 22 is spaced from the neighboring row of first light sources 22 by a predetermined row pitch R1, and each column of first light sources 22 is spaced from the neighboring column of first light sources 22 by a predetermined column pitch C1. In this manner, a gap is formed between two adjacent first light sources 22, like a gap G shown in FIG. 2A and gaps G1, G2, G3, G4, and G5 shown in FIG. 2B.

As shown in FIG. 2B, the depth sensor 30 may include second light sources 31 and light receiving members 32. The second light source 31 may be configured to emit invisible light, for example, infrared light, that is, the second light source 31 may be an infrared light source. Accordingly, the light receiving member 32 may be configured to sense or receive invisible light, for example, infrared light. In the illustrated embodiment, the second light source 31 and the light receiving member 32 of the depth sensor 30 are both disposed in the gap G between the first light sources 22, that is, an orthographic projection of the second light source 31 on the substrate 21 is located within an orthographic projection of the gap G between the two adjacent first light sources 22 on the substrate 21, and/or, an orthographic projection of the light receiving member 32 on the substrate 21 is located within the orthographic projection of the gap G between the two adjacent first light sources 22 on the substrate 21. In the embodiments of the present disclosure, by means of such an arrangement, a depth sensor, particularly a light source and/or a light receiving member of the depth sensor, can be formed in the gap between the light sources, and the depth sensor can be integrated into the light source module, particularly it is beneficial to integrate the depth sensor into a backlight source of a display device and reuse the backlight source of the display device, thereby simplifying the structure and reducing the manufacturing cost.

For example, a plurality of second light sources 31 and a plurality of light receiving members 32 may be provided on the substrate 21, and each of the second light sources 31 may be provided in one single gap G, and each of the light receiving members 32 may be provided in one single gap G. That is, the gaps G where the plurality of second light sources 31 are located are different from the gaps where the plurality of light receiving members 32 are located. In the illustrated embodiment, it is shown that three second light sources 31 and two light receiving members 32 (in a row along the line AA') are provided on the substrate 21, and the three second light sources 31 and the two light receiving members 32 are respectively disposed in five gaps G. It should be noted that the number of the second light sources 31 and the number of the light receiving members 32 are only exemplary, and in other embodiments, a larger number of the second light sources and the light receiving members may be provided, and the number of the second light sources may be equal to or unequal to the number of the light receiving members.

In the illustrated embodiment, the first light sources 22, the second light sources 31, and the light receiving members 32 are located on the same side of the substrate 21, and they may be located in the same layer. For example, the first light sources 22, the second light sources 31, and the light receiving members 32 are all directly disposed on the substrate 21, that is, they all directly contact an upper surface of the substrate 21. For example, the first light sources 22, the second light sources 31, and the light receiving members 32 may be formed on the substrate 21 by a transfer process. In this way, it would not increase the number of the transfer substrates, thereby reducing the process difficulty and saving the processing costs.

For example, a planarization layer may be provided above the first light sources 22, the second light sources 31, and the light receiving members 32, so that other components or other layers may be provided above it.

For example, the plurality of second light sources 31 and the plurality of light receiving members 32 may be alternately disposed in the respective gaps G. Specifically, in the illustrated embodiment, the substrate 21 is formed with five gaps, which are respectively denoted as G1, G2, G3, G4, and G5 from left to right. One second light source 31 is disposed in the gap G1, one light receiving member 32 is disposed in the gap G2 adjacent to the gap G1, one second light source 31 is disposed in the gap G3 adjacent to the gap G2, one light receiving member 32 is disposed in the gap G4 adjacent to the gap G3, and one second light source 31 is disposed in the gap G5 adjacent to the gap G4.

Exemplarily, the light receiving member 32 may be a photosensitive chip, which may include a light receiving portion located in a top part of the light receiving member 32 and a circuit connection portion located in a bottom part of the light receiving member 32. The light receiving portion is connected to a trace on the substrate 21 through the circuit connection portion, and then electrically connected to an external circuit through the trace on the substrate. Similarly, the second light source 31 may be electrically connected to a trace on the substrate 21, and then electrically connected to an external circuit through the trace on the substrate 21.

As shown in FIG. 2B, the depth sensor 30 may further include light converging members 33. For example, the light converging members 33 may be convex lenses, micro lenses, or Fresnel lenses. In the embodiment shown in FIG. 2B, the light converging member 33 is disposed at a side of the light receiving member 32 away from the substrate 21, and the light receiving member 32 is spaced from the light converging member 33 in a direction perpendicular to the substrate 21 (i.e., the up-down direction in FIG. 2B). An orthographic projection of the light converging member 33 on the substrate 21 at least partially overlaps with an orthographic projection of the light receiving member 32 on the substrate 21. For example, the orthographic projection of the light converging member 33 on the substrate 21 covers at least the orthographic projection of the light receiving portion of the light receiving member 32 on the substrate 21. With reference to FIG. 1, the distance between the light receiving member 32 and the light converging member 33 in the direction perpendicular to the substrate 21 (i.e., the up-down direction in FIG. 2B) may be substantially equal to a focal length of the light converging member 33. In this way, the light converging member 33 may focus the light on the light receiving member 32.

Specifically, when the light source module integrated with the depth sensor according to the embodiments of the present disclosure is in operation, the plurality of first light sources 22 may emit visible light for normal display or illumination; the depth sensor 30 disposed in the gaps between the first light sources 22 may emit invisible light, such as infrared light, for sensing depth information, for example, sensing the distance between the second light sources 31 or the light receiving members 32 and the object based on the TOF measurement method. With reference to FIG. 1 and FIG. 2B, the second light sources 31 can emit modulated infrared light, after the infrared light is reflected by the object located above the light source module, the reflected infrared light can be received by the light receiving members 32 under the action of the light converging members 33. Based on the modulated infrared light emitted from the second light sources 31 and the modulated reflected light received by the light receiving members 32, the depth information of the object can be calculated.

In the above embodiments, the second light sources 31 and the light receiving members 32 may be not in one-to-one correspondence with each other, that is, the second light sources 31 are mainly used to provide invisible light such as infrared light, that is, to provide light sources for the depth sensor. In one example, in order to prevent the infrared light emitted from the plurality of second light sources 31 from disturbing with each other, a point-by-point scanning manner may be adopted to excite the plurality of second light sources 31. Specifically, at a first time t1, only the second light source 31A shown in FIG. 2A is excited, the second light source 31A emits infrared light, and the plurality of light receiving members 32 receive reflected infrared light signals; at a second time t2, only the second light source 31B shown in FIG. 2A is excited, the second light source 31B emits infrared light, and the plurality of light receiving members 32 receive reflected infrared light signals; and so forth. The second light sources are excited one by one, thereby only one second light source emits light in the same period of time.

Figure 3A:
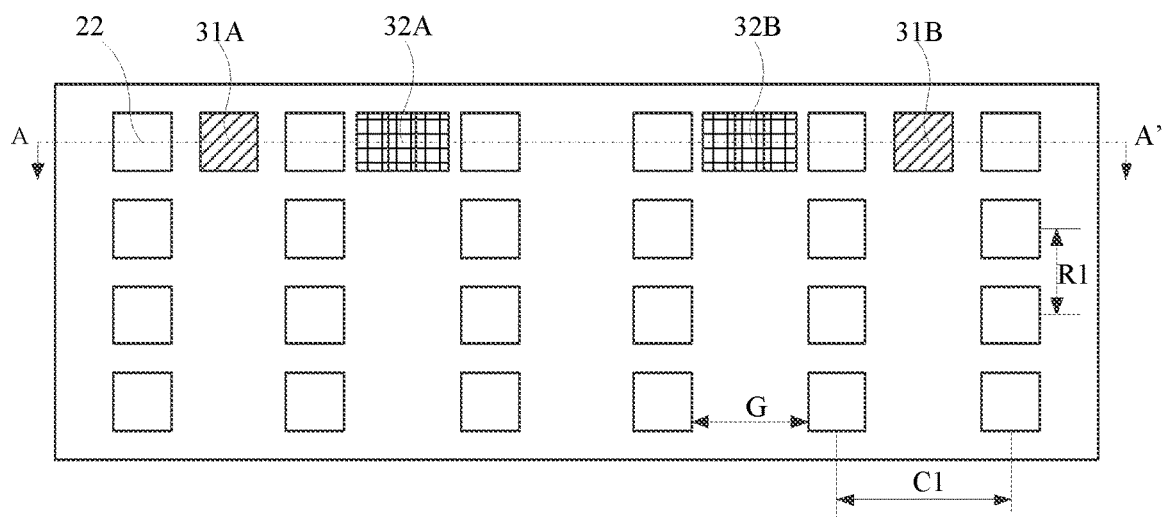
FIG. 3A is a plan view of a light source module according to an embodiment of the present disclosure, in which light sources of a depth sensor are in one-to-one correspondence with light receiving members of the depth sensor.
Figure 3B:
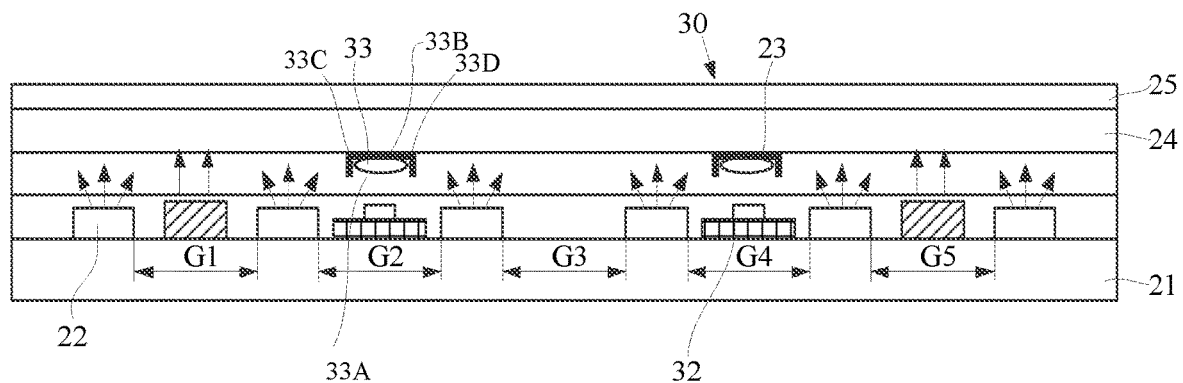
FIG. 3B is a cross-sectional view of the light source module in FIG. 3A taken along a section line AA' according to the embodiment of the present disclosure.

Of course, in other embodiments, the second light sources 31 and the light receiving members 32 may be in one-to-one correspondence with each other. For example, as shown in FIGS. 3A and 3B, one second light source 31A corresponds to one light receiving member 32A, and one second light source 31B corresponds to one light receiving member 32B. In the drawings, two groups of second light sources and light receiving members in one-to-one correspondence with each other are schematically shown, but the embodiments of the present disclosure should not be limited thereto. In other embodiments, more groups of second light sources and light receiving members in one-to-one correspondence with each other may be provided, so that the field of view of multiple groups of second light sources and light receiving members in one-to-one correspondence with each other may cover the entire display region of the display device. "The second light sources and the light receiving members may be in one-to-one correspondence with each other" may mean that the light emitted from one second light source is substantially received by its corresponding light receiving member after being reflected by the object. Based on the modulated infrared light emitted from one second light source and the modulated reflected light received by its corresponding light receiving member, the depth information of the object at a position corresponding to one light receiving member may be calculated. In this way, by providing multiple groups of second light sources and light receiving members in one-to-one correspondence with each other, the entire depth image of the object may be obtained.

As shown in FIG. 2B, the light source module 20 according to the embodiment of the present disclosure may further include first blocking members 23. An orthographic projection of the first blocking member on the substrate at least partially covers the orthographic projection of the second light source on the substrate. The light converging member 33 may include a first side 33A facing the light receiving member 32, a second side 33B away from the light receiving member 32, a third side 33C and a fourth side 33D connecting the first side 33A to the second side 33B. The first blocking member 23 may be provided at the second side 33B, the third side 33C, and the fourth side 33D, that is, the first blocking member 23 may be provided at all other sides of the light converging member 33 except the first side 33A, and an orthographic projection of the first blocking member 23 on the substrate 21 covers the orthographic projection of the light converging member 33 on the substrate 21, so that the first blocking member 23 substantially half surrounds the light converging member 33. The first blocking member 23 may be configured to block transmission of visible light and allow transmission of invisible light such as infrared light. By providing such first blocking members 23, the light emitted from the first light sources 22 will hardly be emitted into the light converging members 33, so that the light emitted from the first light sources 22 can be prevented from being irregularly deflected by the light converging members 33.

Figure 4:
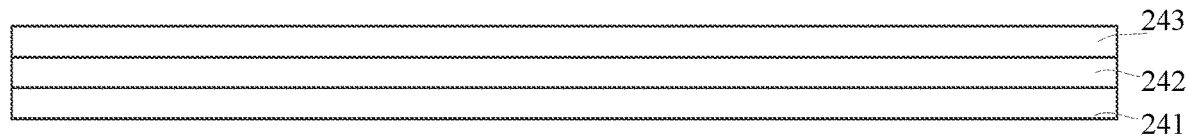
FIG. 4 is a schematic structural view of an optical film layer in a light source module according to an embodiment of the present disclosure.

As shown in FIG. 2B, the light source module 20 according to the embodiment of the present disclosure may further include an optical film layer 24 disposed at a side of the first light sources 22 and the second light sources 31 away from the substrate 21. In the illustrated embodiment, the optical film layer 24 is disposed on a surface of the first blocking members 23 away from the substrate 21. For example, the optical film layer 24 may include at least one of a diffusion sheet, a fluorescent layer, or a prism. As shown in FIG. 4, the optical film layer 24 includes a diffusion sheet 241, a fluorescent layer 242, and a prism 243. The optical film layer 24 is disposed on the light exiting side of the first light sources 22 and the second light sources 31 for affecting the light emitted from the first light sources 22 and the second light sources 31. For example, the diffusion sheet 241 is configured to diffuse the light emitted from the first light sources 22 and the second light sources 31. The fluorescent layer 242 may include a phosphor layer or a quantum dot layer for converting the color of the light emitted from the first light sources 22. Exemplarily, the first light sources 22 may be mini LEDs that emit blue light, the fluorescent layer 242 may include red quantum dots that may be excited by blue light to emit red light, and green quantum dots that may be excited by blue light to emit green light, and the fluorescent layer 242 may convert the blue light emitted from the first light sources 22 into red light and green light. During the conversion, light diffusion may be further achieved. In this way, the blue light, the red light, and the green light may be mixed, so that the light source module 20 may emit uniform white light. The prism 243 may uniformize the light emitted from the first light sources 22 and the second light sources 31.

In one example, the light source module 20 according to the embodiments of the present disclosure may further include a polarizer 25 disposed on a side of the optical film layer 24 away from the substrate 21 so that the light source module 20 emits polarized light.

In the embodiment shown in FIG. 2B, the light converging members 33 are disposed at a side of the optical film layer 24 adjacent to the substrate 21, that is, on a lower surface of the optical film layer 24 facing the substrate 21. In a case where the first blocking members 23 are provided, the light converging members 33 and the first blocking members 23 are both disposed on the side of the optical film layer 24 adjacent to the substrate 21, that is, on the lower surface of the optical film layer 24 facing the substrate 21.

Figure 5:
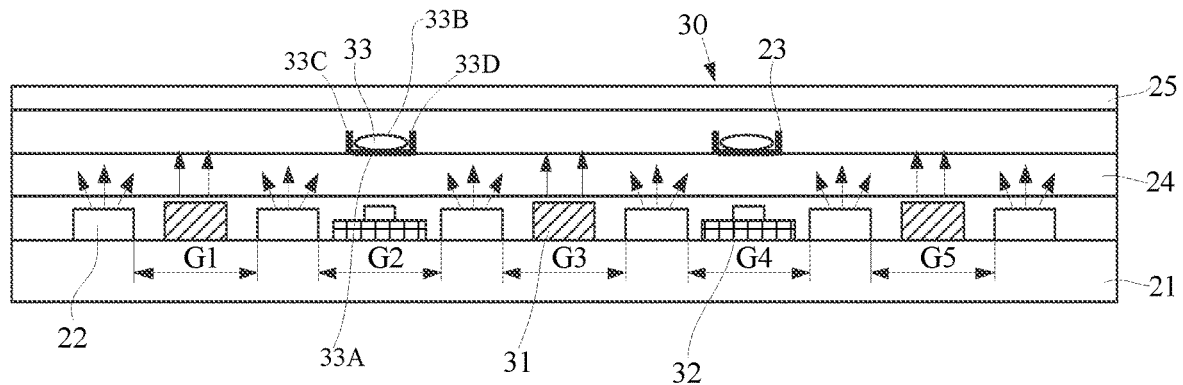
FIG. 5 is a cross-sectional view of the light source module in FIG. 2A taken along a section line AA' according to another embodiment of the present disclosure.

In one example, FIG. 5 is a cross-sectional view of the light source module in FIG. 2A taken along a section line AA' according to another embodiment of the present disclosure. It should be noted that, except the arrangement positions of the light converging members and/or the first blocking members, the structure of the light source module according to this embodiment is the same as that of the light source module in the embodiment shown in FIG. 2B.

As shown in FIG. 5, the light converging members 33 are disposed on a side of the optical film layer 24 away from the substrate 21, that is, on an upper surface of the optical film layer 24 away from the substrate 21. In a case where the first blocking members 23 are provided, the light converging members 33 and the first blocking members 23 are both disposed on the side of the optical film layer 24 away from the substrate 21, that is, on the upper surface of the optical film layer 24 away from the substrate 21. With reference to FIG. 1, the distance between the light receiving member 32 and the light converging member 33 in the direction perpendicular to the substrate 21 (i.e., the up-down direction in FIG. 5) may be substantially equal to the focal length of the light converging member 33. In this way, the light converging member 33 may focus the light on the light receiving member 32. In the embodiment shown in FIG. 5, the thickness of the optical film layer may be designed in such a way that the distance between the light receiving member 32 and the light converging member 33 in the direction perpendicular to the substrate 21 (i.e., the up-down direction in FIG. 5) may be substantially equal to the focal length of the light converging member 33, to ensure that the light converging member 33 focuses the light on the light receiving member 32.

In the embodiment shown in FIG. 5, the light converging member 33 may include a first side 33A facing the light receiving member 32, a second side 33B away from the light receiving member 32, and a third side 33C and a fourth side 33D connecting the first side 33A to the second side 33B. The first blocking member 23 may be disposed on the first side 33A, the third side 33C, and the fourth side 33D, that is, the first blocking member 23 may be disposed on all sides of the light converging member 33 other than the second side 33B, and an orthographic projection of the first blocking member 23 on the substrate 21 covers the orthographic projection of the light converging member 33 on the substrate 21, so that the first blocking member 23 substantially half surrounds the light converging member 33. The first blocking member 23 may be configured to block transmission of visible light and allow transmission of invisible light such as infrared light. By providing such first blocking members 23, the light emitted from the first light sources 22 will hardly be emitted into the light converging members 33, so that the light emitted from the first light sources 22 and the light diffused by the optical film layer 24 can be prevented from being irregularly converged by the light converging member 33.

Figure 6:
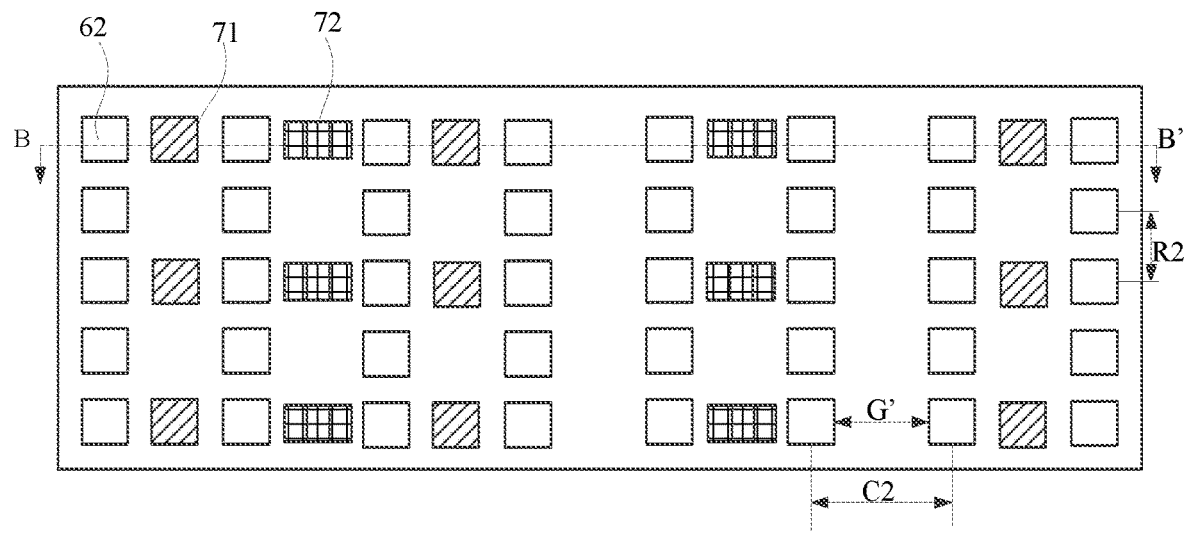
FIG. 6 is a plan view of a light source module according to another embodiment of the present disclosure.
Figure 7:
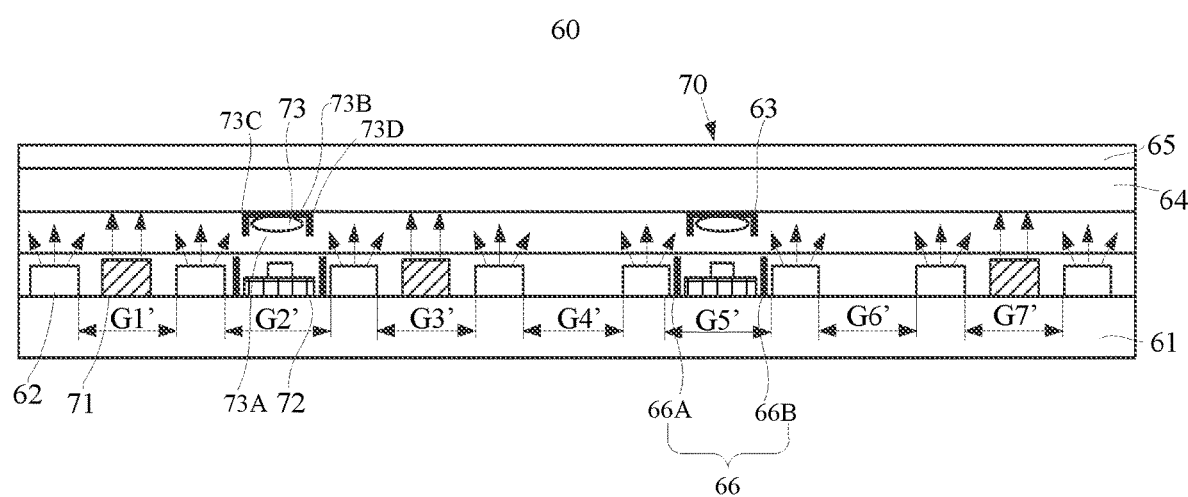
FIG. 7 is a cross-sectional view of the light source module in FIG. 6 taken along a section line BB' according to the embodiment of the present disclosure.

FIG. 6 is a plan view of a light source module according to another embodiment of the present disclosure, and FIG. 7 is a cross-sectional view of the light source module in FIG. 6 taken along a section line BB' according to the embodiment of the present disclosure. It should be noted that, in order to show planar positional relationship between various light sources in the light source module and the light source/the light receiving member of the depth sensor, some components are omitted in FIG. 6, for example, some layers above the light sources are omitted. As shown in FIGS. 6 and 7, the light source module 60 according to the embodiment of the present disclosure may include a substrate 61, a plurality of first light sources 62 disposed on the substrate 61, and a depth sensor 70 disposed on the substrate 61.

For example, the substrate 61 may be a circuit board (for example, PCB or FPC) or a glass substrate. In the exemplary embodiment of FIGS. 6 and 7, the substrate 61 is a glass substrate.

For example, the first light sources 62 may be light sources for emitting visible light. For example, the first light sources 62 may be light emitting diodes (LEDs for short). Specifically, the first light source 62 may be micro light emitting diodes (micro LEDs). The plurality of first light sources 62 may be spaced on the substrate 61, as shown in FIG. 6, the plurality of first light sources 62 are arranged on the substrate 61 in an array. Each row of first light sources 62 is spaced from the neighboring row of first light sources 62 by a predetermined row pitch R2, and each column of first light sources 62 is spaced from the neighboring column of first light sources 62 by a predetermined column pitch C2. In this way, a gap is formed between two adjacent first light sources 62, like a gap G' shown in FIG. 6 and gaps G1', G2', G3', G4', G5', G6' and G7' shown in FIG. 7. It can be seen from FIG. 6 in combination with FIG. 2A that the first light sources 62 may be arranged on the substrate more densely than the first light sources 22, that is, the row pitch R2 may be less than the row pitch R1, the column pitch C2 may be less than the column pitch C1, and the gap G' may be less than the gap G.

As shown in FIG. 7, the depth sensor 70 may include second light sources 71 and light receiving members 72. The second light source 71 may be configured to emit invisible light, for example, infrared light, that is, the second light source 71 may be an infrared light source. Accordingly, the light receiving member 72 may be configured to sense or receive invisible light, for example, infrared light. In the illustrated embodiment, the second light source 71 and the light receiving member 72 of the depth sensor 70 are both disposed in the gap G' between the first light sources 62, that is, an orthographic projection of the second light source 71 on the substrate 61 is located within an orthographic projection of the gap G' between two adjacent first light sources 62 on the substrate 61, and/or, an orthographic projection of the light receiving member 72 on the substrate 61 is located within the orthographic projection of the gap G' between the two adjacent first light sources 62 on the substrate 61.

For example, a plurality of second light sources 71 and a plurality of light receiving members 72 may be provided on the substrate 61, each of second light sources 71 may be provided in one single gap G', and each of the light receiving members 72 may be provided in one single gap G'. That is, the gaps G' where the plurality of second light sources 71 are located are different from the gaps where the plurality of light receiving members 72 are located. In the illustrated embodiment, it is shown that three second light sources 71 and two light receiving members 72 (in a row along the line BB') are provided on the substrate 61, and the three second light sources 71 and the two light receiving members 72 are respectively disposed in five gaps G'. It should be noted that the number of the second light sources 71 and the number of the light receiving members 72 are only exemplary, and in other embodiments, a larger number of the second light sources and the light receiving members may be provided, and the number of the second light sources may be equal to or unequal to the number of the light receiving members.

In the illustrated embodiment, the first light sources 62, the second light sources 71, and the light receiving members 72 are located in the same layer. For example, the first light sources 62, the second light sources 71, and the light receiving members 72 are all directly disposed on the substrate 61, that is, they all directly contact an upper surface of the substrate 61. For example, the first light sources 62, the second light sources 71, and the light receiving members 72 may be formed on the substrate 61 by a transfer process. In this way, it would not increase the number of the transfer substrates, thereby reducing the process difficulty and saving the processing costs.

For example, the plurality of second light sources 71 and the plurality of light receiving members 72 may be alternately disposed in the respective gaps G'. Specifically, in the illustrated embodiment, the substrate 61 is formed with seven gaps, which are respectively denoted as G1', G2', G3', G4', G5', G6', and G7' from left to right. One second light source 71 is disposed in the gap G1', one light receiving member 72 is disposed in the gap G2' adjacent to the gap G1', one second light source 71 is disposed in the gap G3' adjacent to the gap G2', one light receiving member 72 is disposed in the gap G5', and one second light source 71 is disposed in the gap G7'.

Exemplarily, the light receiving member 72 may be a photosensitive chip, which may include a light receiving portion located in a top part of the light receiving member 72 and a circuit connection portion located in a bottom part of the light receiving member 72. The light receiving portion is connected to a trace on the substrate 61 through the circuit connection portion, and then electrically connected to an external circuit through the trace on the substrate 61. Similarly, the second light source 71 may be electrically connected to a trace on the substrate 61 and then electrically connected to an external circuit through the trace on the substrate 61.

As shown in FIG. 7, the depth sensor 70 may further include light converging members 73. For example, the light converging members 73 may be convex lenses, micro lenses, or Fresnel lenses. In the embodiment shown in FIG. 7, the light converging member 73 is disposed at a side of the light receiving member 72 away from the substrate 61, and the light receiving member 72 is spaced from the light converging members 73 in a direction perpendicular to the substrate 61 (i.e., the up-down direction in FIG. 7). An orthographic projection of the light converging member 73 on the substrate 61 at least partially overlaps with an orthographic projection of the light receiving member 72 on the substrate 61. For example, the orthographic projection of the light converging member 73 on the substrate 61 covers at least the orthographic projection of the light receiving portion of the light receiving member 72 on the substrate 61. With reference to FIG. 1, the distance between the light receiving member 72 and the light converging member 73 in the direction perpendicular to the substrate 61 (i.e., the up-down direction in FIG. 7) may be substantially equal to a focal length of the light converging member 73. In this way, the light converging member 73 may focus the light on the light receiving member 72.

Specifically, when the light source module integrated with the depth sensor according to the embodiments of the present disclosure is in operation, the plurality of first light sources 62 may emit visible light for normal display or illumination; the depth sensor 70 disposed in the gaps between the first light sources 62 may emit invisible light, such as infrared light, for sensing depth information, for example, sensing the distance between the second light sources 71 or the light receiving members 72 and the object based on the TOF measurement method. With reference to FIG. 1 and FIG. 7, the second light sources 71 can emit modulated infrared light. After the infrared light is reflected by the object located above the light source module, the reflected infrared light can be received by the light receiving member 72 under the action of the light converging members 73. Based on the modulated infrared light emitted from the second light sources 71 and the modulated reflected light received by the light receiving members 72, the depth information of the object can be calculated.

As shown in FIG. 7, the light source module 60 according to the embodiment of the present disclosure may further include first blocking members 63. The light converging member 73 may include a first side 73A facing the light receiving member 72, a second side 73B away from the light receiving member 72, a third side 73C and a fourth side 73D connecting the first side 73A to the second side 73B. The first blocking member 63 may be provided on the second side 73B, the third side 73C, and the fourth side 73D, that is, the first blocking member 63 may be provided on all other sides of the light converging member 73 except the first side 73A, and an orthographic projection of the first blocking member 63 on the substrate 61 covers the orthographic projection of the light converging member 73 on the substrate 61, so that the first blocking member 63 substantially half surrounds the light converging member 73. The first blocking member 63 may be configured to block transmission of visible light and allow transmission of invisible light such as infrared light. By providing such first blocking members 63, the light emitted from the first light sources 62 will hardly be emitted into the light converging member 73, so that the light emitted from the first light sources 62 can be prevented from being irregularly deflected by the light converging members 73.

As shown in FIG. 7, the light source module 60 according to an embodiment of the present disclosure may further include an optical film layer 64 disposed at a side of the first light sources 62 and the second light sources 71 away from the substrate 61. In the illustrated embodiment, the optical film layer 64 is disposed on a surface of the first blocking members 63 away from the substrate 61. For example, the optical film layer 64 may include at least one of a diffusion sheet, a fluorescent layer, or a prism. The structure and function of the optical film layer 64 are the same as the structure and function of the optical film layer 24, and reference may be made to the description of the optical film layer 24 above, therefore it would not be repeated here.

In an example, the light source module 60 according to the embodiments of the present disclosure may further include a polarizer 65 disposed on a side of the optical film layer 64 away from the substrate 61 so that the light source module 60 emits polarized light.

As shown in FIG. 7, the light source module 60 according to the embodiments of the present disclosure may further include second blocking members 66 disposed on both sides of the light receiving members 72 facing the first light sources 62. Specifically, the second blocking member 66 may include a blocking sub-portion 66A and a blocking sub-portion 66B. The blocking sub-portion 66A may be disposed at the left side of one light receiving member 72, that is, between the light receiving member 72 and the first light source 62 adjacent to the left side of the light receiving member 72, and the blocking sub-portion 66B may be disposed on the right side of the light receiving member 72, that is, between the light receiving member 72 and the first light source 62 adjacent to the right side of the light receiving member 72. The second blocking member 66 may be configured to block transmission of visible light and allow transmission of invisible light such as infrared light. In this embodiment, since the substrate 61 is a transparent glass substrate, there may be light incident from the substrate 61 (for example, oblique incidence). By providing the second blocking members, light transmitted in other directions may be blocked to prevent such light affecting the light receiving members.

In the embodiment shown in FIG. 7, the light converging members 73 are disposed on a side of the optical film layer 64 adjacent to the substrate 61, that is, on a lower surface of the optical film layer 64 facing the substrate 61. In a case where the first blocking members 63 are provided, the light converging members 73 and the first blocking members 63 are both disposed on the side of the optical film layer 64 adjacent to the substrate 61, that is, on the lower surface of the optical film layer 64 facing the substrate 61.

Figure 8:
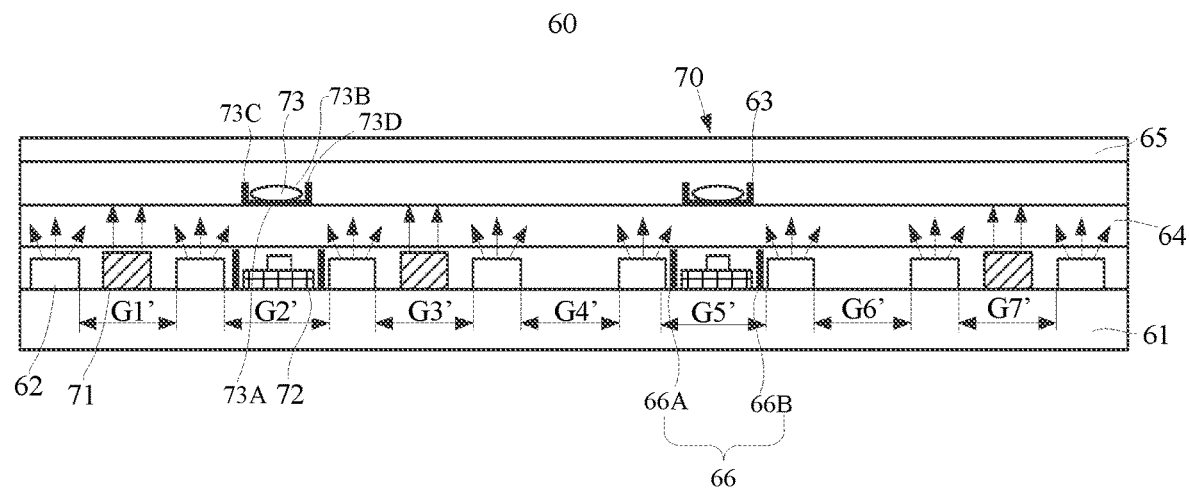
FIG. 8 is a cross-sectional view of the light source module in FIG. 6 taken along a section line BB' according to another embodiment of the present disclosure.

In an example, FIG. 8 is a cross-sectional view of the light source module in FIG. 6 taken along a section line BB' according to another embodiment of the present disclosure. It should be noted that, except the arrangement positions of the light converging members and/or the first blocking members, the structure of the light source module according to this embodiment is the same as that of the light source module in the embodiment shown in FIG. 7.

As shown in FIG. 8, the light converging members 73 are disposed on a side of the optical film layer 64 away from the substrate 61, that is, on an upper surface of the optical film layer 64 away from the substrate 61. In a case where the first blocking members 63 are provided, the light converging members 73 and the first blocking members 63 are both disposed on the side of the optical film layer 64 away from the substrate 61, that is, on the upper surface of the optical film layer 64 away from the substrate 61. With reference to FIG. 1, the distance between the light receiving member 72 and the light converging member 73 in the direction perpendicular to the substrate 61 (i.e., the up-down direction in FIG. 8) may be substantially equal to the focal length of the light converging member 73. In this way, the light converging member 73 may focus the light on the light receiving member 72. In the embodiment shown in FIG. 8, the thickness of the optical film layer may be designed in such a way that the distance between the light receiving member 72 and the light converging member 73 in the direction perpendicular to the substrate 61 (i.e., the up-down direction in FIG. 8) may be substantially equal to the focal length of the light converging member 73, to ensure that the light converging member 73 focuses the light on the light receiving member 72.

In the embodiment shown in FIG. 8, the light converging member 73 may include a first side 73A facing the light receiving member 72, a second side 73B away from the light receiving member 72, and a third side 73C and a fourth side 73D connecting the first side 73A to the second side 73B. The first blocking member 63 may be disposed on the first side 73A, the third side 73C, and the fourth side 73D, that is, the first blocking member 63 may be disposed on all sides of the light converging member 73 other than the second side 73B, and an orthographic projection of the first blocking member 63 on the substrate 61 covers the orthographic projection of the light converging member 73 on the substrate 61, so that the first blocking member 63 substantially half surrounds the light converging member 73. The first blocking member 63 may be configured to block transmission of visible light and allow transmission of invisible light such as infrared light. By providing such first blocking members 63, the light emitted from the first light sources 62 will hardly be emitted into the light converging members 73, so that the light emitted from the first light sources 62 and the light diffused by the optical film layer 64 can be prevented from being irregularly converged by the light converging member 73.

Figure 9:
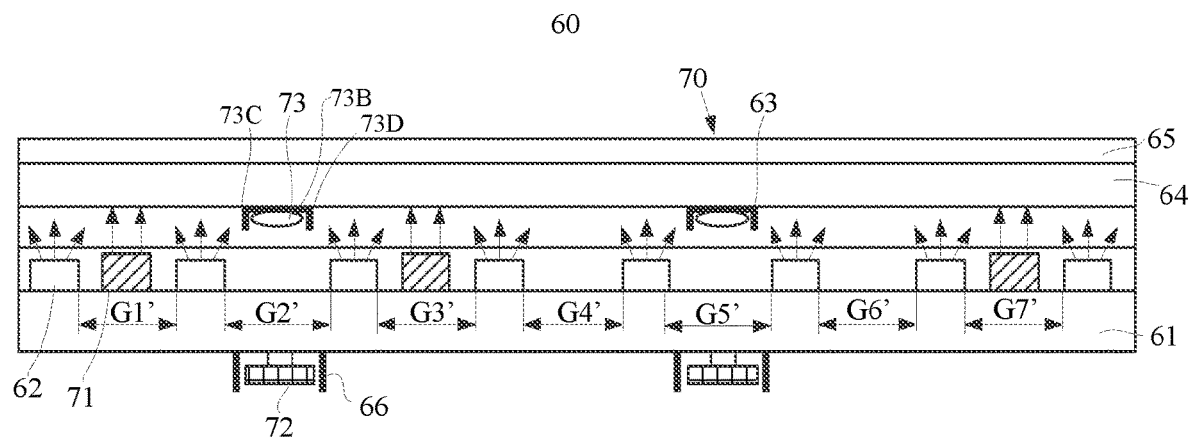
FIG. 9 is a cross-sectional view of the light source module in FIG. 6 taken along a section line BB' according to yet another embodiment of the present disclosure.

In an example, FIG. 9 is a cross-sectional view of the light source module in FIG. 6 taken along a section line BB' according to yet another embodiment of the present disclosure. It should be noted that, except the arrangement positions of the light receiving members and/or the second blocking members, the structure of the light source module according to this embodiment is the same as that of the light source module in the embodiment shown in FIG. 7.

As shown in FIG. 9, the light receiving members 72 are disposed on a side of the substrate 61 away from the first light sources 62 and the second light sources 71, that is, on the lower surface of the substrate 61. In a case where the second blocking members 66 are provided, the light receiving members 72 and the second blocking members 66 are both disposed on the side of the substrate 61 away from the first light sources 62 and the second light sources 71, that is, on the lower surface of the substrate 61. Specifically, the first light sources 62 and the second light sources 71 are disposed on one side of the substrate 61, for example, the first light sources 62 and the second light sources 71 are disposed on the upper surface of the substrate 61, and the first light sources 62 and the second light sources 71 are located in the same layer. The light receiving members 72 and the second blocking members 66 are both disposed on the side of the substrate 61 away from the first light sources 62 and the second light sources 71, that is, on the lower surface of the substrate 61, and the light receiving members 72 and the second blocking members 66 are located in the same layer. In this embodiment, the light receiving members and the light sources are disposed on different sides of the substrate, thereby the light receiving members and the light sources can be manufactured separately, so that they can be manufactured without affecting each other.

Figure 10:
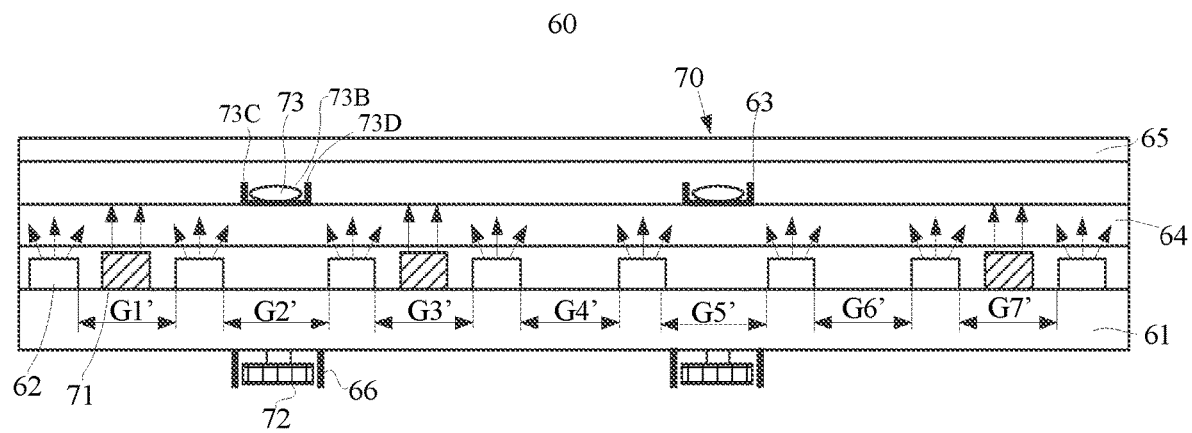
FIG. 10 is a cross-sectional view of the light source module in FIG. 6 taken along a section line BB' according to still another embodiment of the present disclosure.

In an example, FIG. 10 is a cross-sectional view of the light source module in FIG. 6 taken along a section line BB' according to still another embodiment of the present disclosure. It should be noted that, except the arrangement positions of the light receiving members and/or the second blocking members, the structure of the light source module according to this embodiment is the same as that of the light source module in the embodiment shown in FIG. 8.

As shown in FIG. 10, the light receiving members 72 are disposed on a side of the substrate 61 away from the first light sources 62 and the second light sources 71, that is, on the lower surface of the substrate 61. In a case where the second blocking members 66 are provided, the light receiving members 72 and the second blocking members 66 are both disposed on the side of the substrate 61 away from the first light sources 62 and the second light sources 71, that is, on the lower surface of the substrate 61. Specifically, the first light sources 62 and the second light sources 71 are disposed on one side of the substrate 61, for example, the first light sources 62 and the second light sources 71 are disposed on the upper surface of the substrate 61, and the first light sources 62 and the second light sources 71 are located in the same layer. The light receiving members 72 and the second blocking members 66 are both disposed on the side of the substrate 61 away from the first light sources 62 and the second light sources 71, that is, on the lower surface of the substrate 61, and the light receiving members 72 and the second blocking members 66 are located in the same layer. In this embodiment, the light receiving members and the light sources are disposed on different sides of the substrate respectively, thereby the light receiving members and the light source scan be manufactured separately, so that they can be manufactured without affecting each other.

Further, the light source module according to the above embodiments of the present disclosure may be used in a display module. For example, the light source module according to the above embodiments of the present disclosure may be used as a backlight module of a display device.

Figure 11:
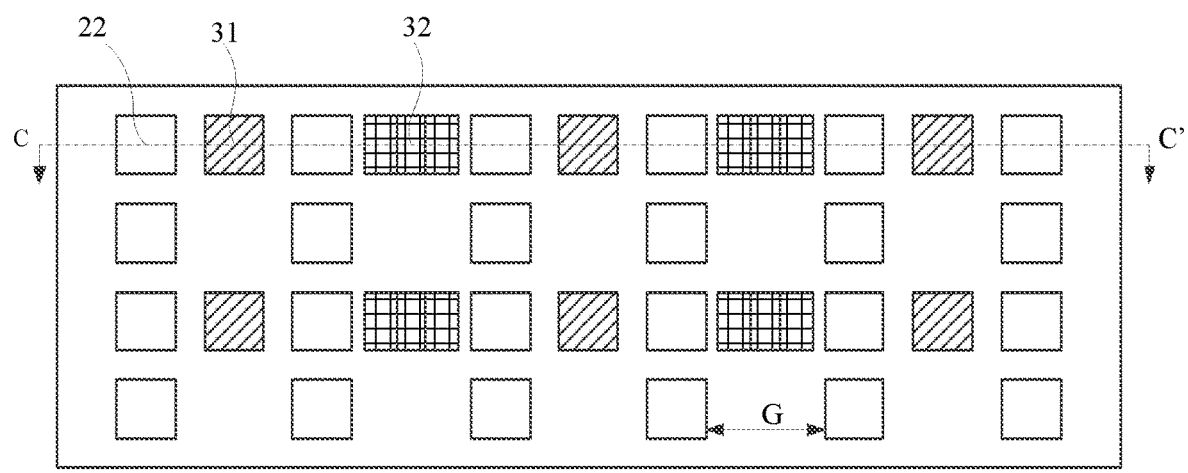
FIG. 11 is a plan view of a display module according to an embodiment of the present disclosure.
Figure 12:
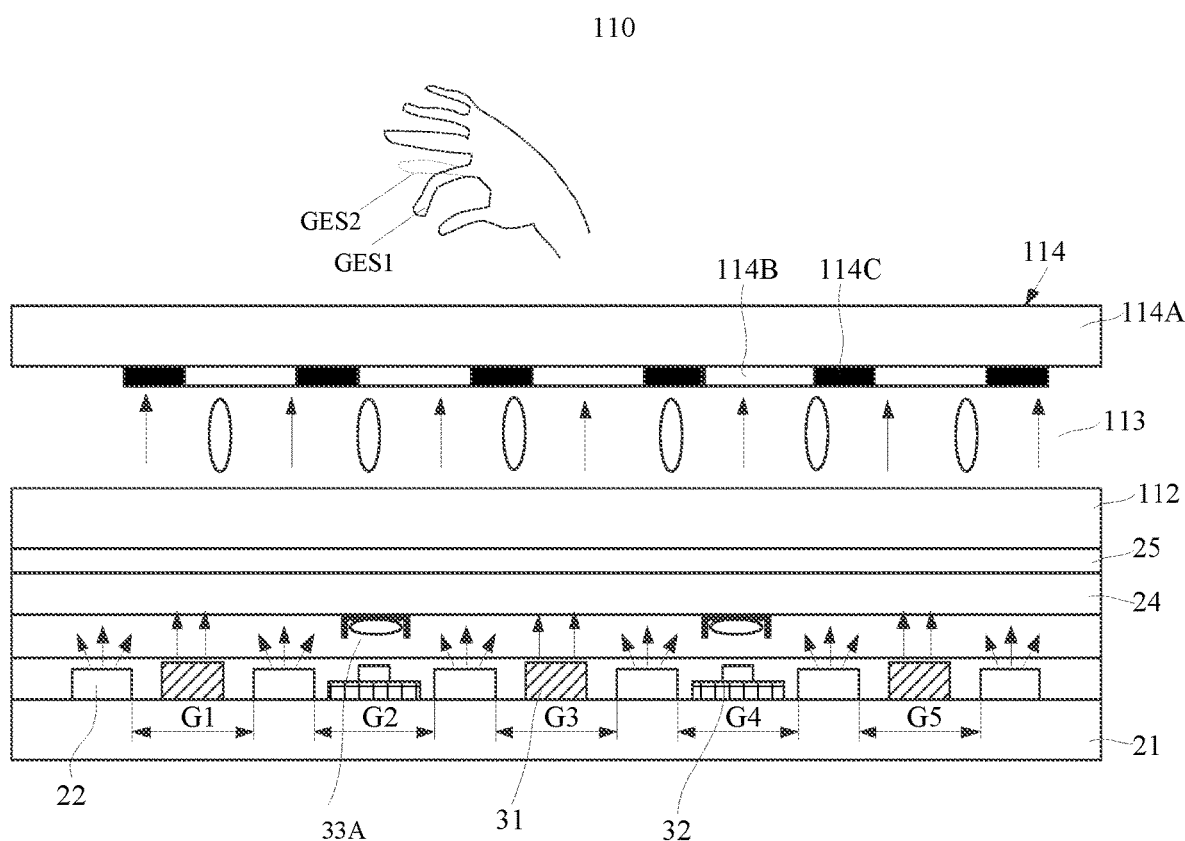
FIG. 12 is a cross-sectional view of the display module in FIG. 11 taken along a section line CC' according to the embodiment of the present disclosure.

FIG. 11 is a plan view of a display module according to an embodiment of the present disclosure; FIG. 12 is a cross-sectional view of the display module in FIG. 11 taken along a section line CC' according to the embodiment of the present disclosure. It should be noted that, in order to show planar positional relationship between various light sources in the light source module and the light source/the light receiving member of the depth sensor, some components are omitted in FIG. 11, for example, some layers above the light sources are omitted. As shown in FIG. 11 and FIG. 12, the display module according to the embodiment of the present disclosure may be a liquid crystal display device 110. Specifically, it may include a backlight module and a LCD display panel, the backlight module may be the light source module according to any one of the above embodiments. For example, in the example shown in FIG. 12, the backlight module is the light source module 20 shown in FIGS. 2A and 2B. It should be understood that the backlight module may also be the light source module shown in FIGS. 3A-3B, 5-10, the specific structure of the backlight module may refer to the description of the light source module in the above embodiments, and therefore it will not be repeated here. For example, the LCD display panel may include an array substrate 112, a color filter substrate 114 disposed opposite to the array substrate, and a liquid crystal layer 113 disposed between the array substrate and the color filter substrate, the detailed structure of the LCD display panel may refer to the common structure of LCD display panels in the related art, and therefore it will not be repeated here.

As shown in FIG. 12, the liquid crystal display device 110 may adopt a structure of a direct-lit backlight source, that is, the backlight module is disposed directly below the LCD display panel. In the embodiments of the present disclosure, the backlight module adopts mini LEDs or micro LEDs arranged in an array on the substrate as a light source, which can provide a uniform backlight and thus improve the display image quality.

For example, the color filter substrate 114 may include a base substrate 114A, a color filter 114B disposed on the base substrate 114A, and a black matrix 114C disposed on the base substrate 114A. The black matrix 114C may be configured to block transmission of visible light and allow transmission of invisible light such as infrared light. Exemplarily, the black matrix 114C, the first blocking members 23/63, and the second blocking members 66 may be made of the same material.

Figure 13:
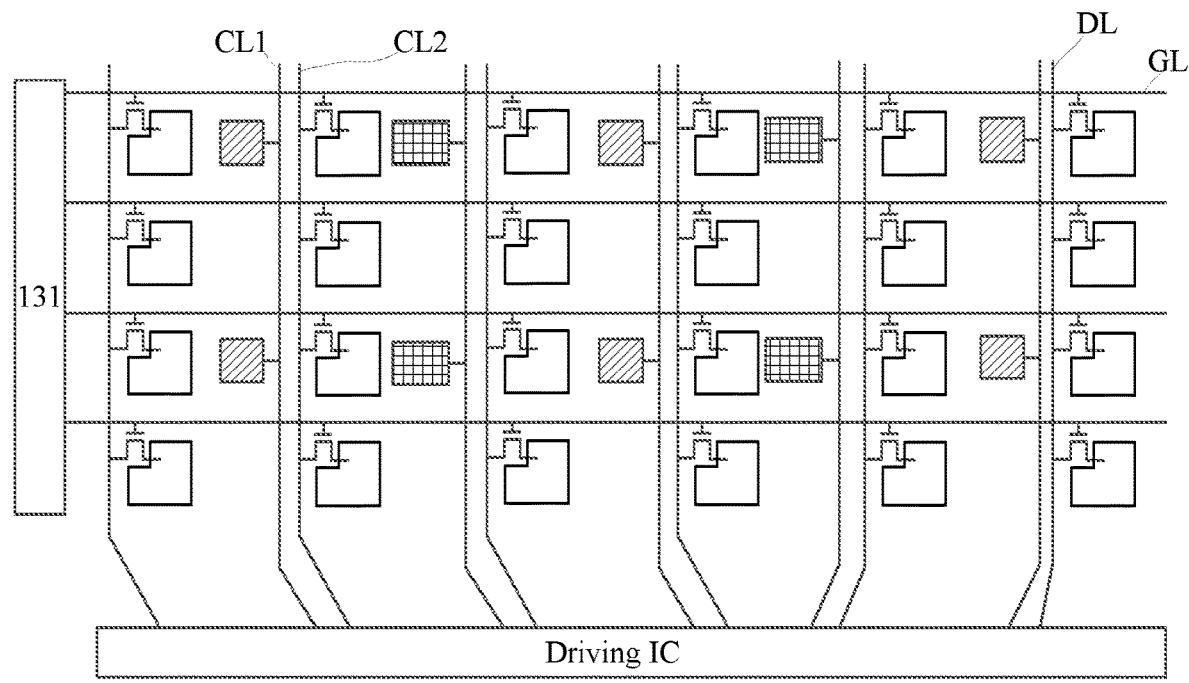
FIG. 13 schematically illustrates positional relationship between pixels and a depth sensor in a display module according to an embodiment of the present disclosure.

FIG. 13 schematically illustrates positional relationship between pixels and a depth sensor in a display module according to an embodiment of the present disclosure. As shown in FIG. 13, in the display module according to the embodiment of the present disclosure, a plurality of parallel gate lines GL and a plurality of parallel data lines DL are provided. The transistors of the pixels of the display panel are electrically connected to the gate lines GL and data lines DL, respectively, the gate lines GL are electrically connected to a gate driving circuit 131, and the data lines DL are electrically connected to a driving IC. Moreover, in the display module according to the embodiments of the present disclosure, first traces CL1 and second traces CL2 are further provided, the second light sources 31 are electrically connected to the first traces CL1, the light receiving members 32 are electrically connected to the second traces CL2, the first traces CL1 and the second traces CL2 are also electrically connected to the driving IC. Exemplarily, the first traces CL1 and the second traces CL2 are both parallel to the data lines DL.

In the embodiment shown in FIG. 12, the backlight module not only includes first light sources that can emit visible light for display, but also is integrated with a depth sensor. Therefore, the display device including the backlight module can not only achieve normal display, but also achieve high-precision spatial positioning and human-computer interaction. Next, "gesture recognition" is taken as an example to explain the process of the display device according to the embodiments of the present disclosure to achieve normal display and high-precision spatial positioning and human-computer interaction.

In response to a first signal, the first light sources 22 are driven to emit visible light, such as blue light. Part of the blue light emitted from the first light sources 22 is converted into red light and green light by the optical film layer 24, and the blue light, red light, and green light are mixed, so that the light source module 20 can emit uniform white light. The white light is polarized through the polarizer 25, and then becomes polarized light. The polarized light is incident on the LCD display panel for normal display.

In response to a second signal, the second light sources 31 are driven to emit modulated infrared light. Since the infrared light is invisible light, it does not affect normal display. After the modulated infrared light is reflected by the object (for example, a user's hand located above the display panel), the reflected light successively passes through the display panel, the light converging members 33, and is received by the light receiving members 32. Based on the modulated infrared light emitted from the second light sources 31 and the modulated reflected light received by the light receiving members 32, the depth information of the object can be calculated. Further, the change in the depth information of the object may be recognized according to the depth information of the object. For example, it may be recognized that the user's hand changes from the gesture GES1 (for example, the index finger is moved closer to the thumb) to the gesture GES2 (for example, the index finger is moved upward and away from the thumb), that is, to realize gesture recognition.

In an example, the driving signal for the first light sources 22 adjacent to the light receiving members 32 may be changed. For example, the brightness of the light emitted from the first light sources 22 adjacent to the light receiving members 32 may be increased by changing the driving signal, to further improve display uniformity.

Figure 14:
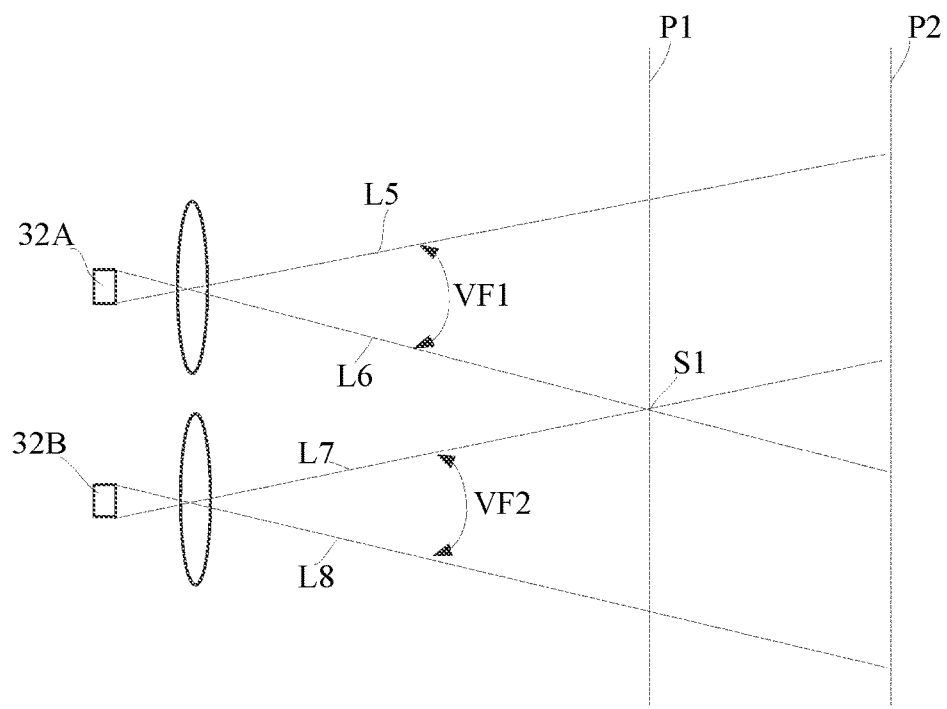
FIG. 14 is an equivalent optical path diagram of a display module integrated with a depth sensor.

FIG. 14 is an equivalent optical path diagram of a display module integrated with a depth sensor. With reference to FIG. 1 and FIG. 14, as described above, each depth sensor has a certain field of view. Specifically, as shown in FIG. 14, the first light receiving member 32A has a field of view VF1 defined by lines L5 and L6, the second light receiving member 32B has a field of view VF2 defined by lines L7 and L8, and the fields of view VF1 and VF2 have an intersection point 51 in a first plane P1. By properly designing the position of each light receiving member 32, especially the distance between the light receiving members 32, the formed images may be spliced to form a complete depth map after all the light receiving members 32 of the display module perform imaging, that is, all the fields of view of the light receiving members 32 just cover the entire display region of the display module (such as the region in the plane indicated by P2 in FIG. 14), thereby facilitating the realization of gesture recognition and spatial interaction.

Figure 15:
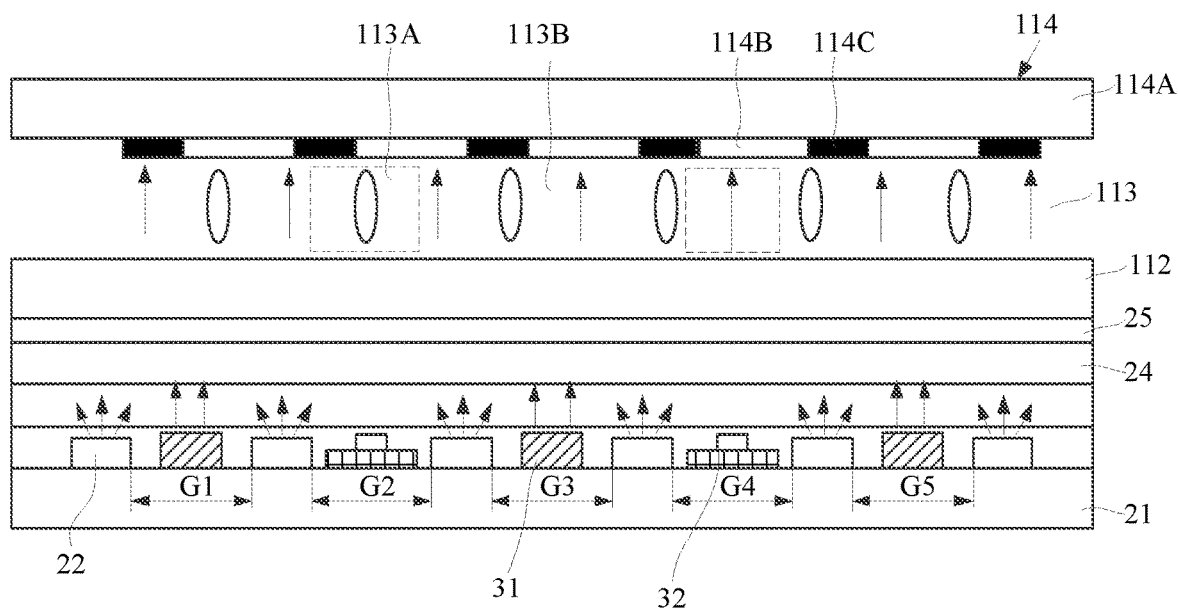
FIG. 15 is a cross-sectional view of a display module according to another embodiment of the present disclosure.

FIG. 15 is a cross-sectional view of a display module according to another embodiment of the present disclosure. In the embodiment shown in FIG. 15, the light converging members and the first blocking members in the foregoing embodiments may be omitted, and the liquid crystal layer may be reused as a light converging member.

For example, the liquid crystal layer 113 may include a first portion 113A and a second portion 113B. An orthographic projection of the first portion 113A of the liquid crystal layer 113 on the substrate 21 coincides with an orthographic projection of the light receiving members 32 on the substrate 21, and an orthographic projection of the second portion 113B of the liquid crystal layer 113 on the substrate 21 does not coincide with the orthographic projection of the light receiving members 32 on the substrate 21.

The reuse process of the liquid crystal layer 113 is as follows: in a display phase, liquid crystal molecules in the liquid crystal layer (including the first portion 113A and the second portion 113B of the liquid crystal layer) are deflected in response to a display signal, to achieve a display function; in a depth imaging phase, the liquid crystal molecules in the first portion 113A of the liquid crystal layer are deflected in response to a depth imaging signal, so that the first portion 113A of the liquid crystal layer is formed as a light converging member, and the infrared light reflected by the hand may be converged on the light receiving member 32.

In this embodiment, it is unnecessary to separately provide light converging members and first blocking member, which can simplify the structure of the display module and reduce processing steps.

Figure 16:
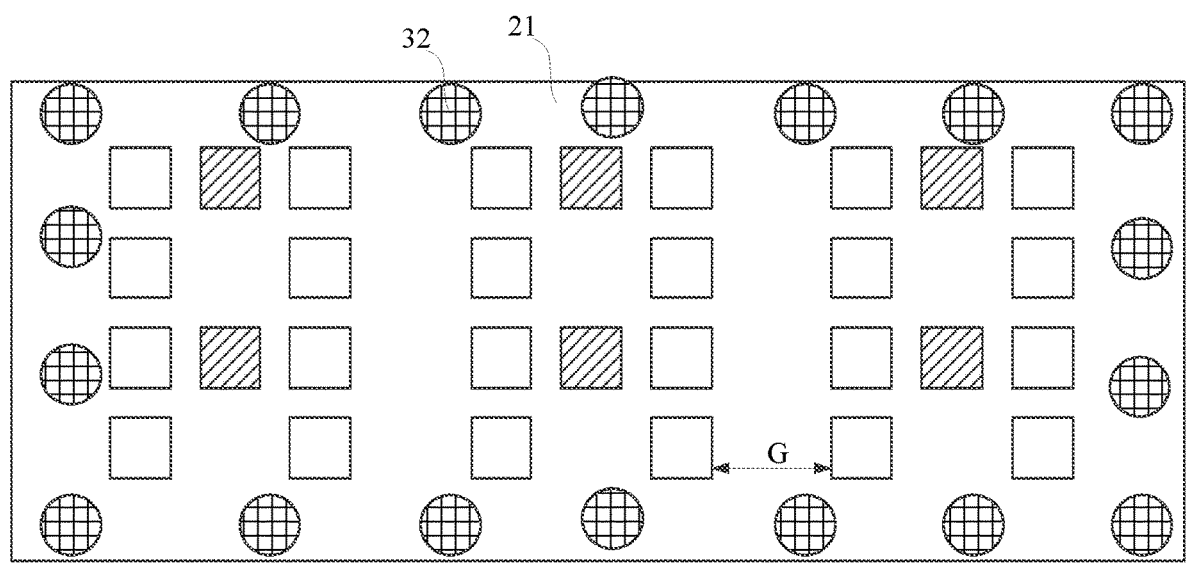
FIG. 16 is a plan view of a display module according to yet another embodiment of the present disclosure.

In the above embodiments, the light receiving members of the depth sensor are all disposed in a display region of the display module. Alternatively or additionally, the light receiving members may be disposed in a non-display region of the display module, for example, in a peripheral region or a surrounding region. As shown in FIG. 16, the plurality of light receiving members 32 may be disposed in the peripheral region of the substrate 21, and the peripheral region corresponds to the non-display region of the display module, and more specifically, it corresponds to a frame region of a display screen.

It should be understood that, in this embodiment, since the plurality of light receiving members 32 are all disposed in the peripheral region of the substrate 21, the fields of view of the plurality of light receiving members 32 need to cooperate with each other, so that the combination of the fields of view of the plurality of light receiving members 32 can cover a central region of the display module.

Figure 17:
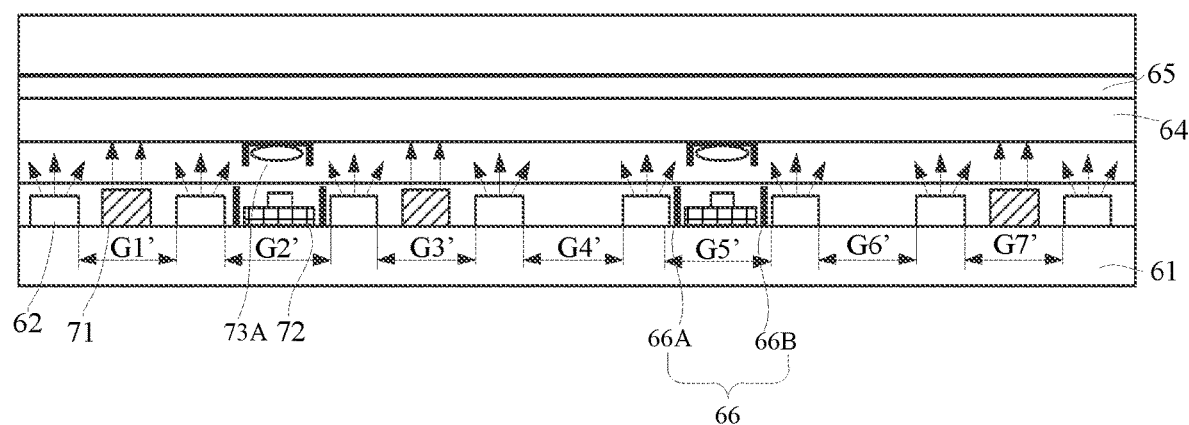
FIG. 17 is a cross-sectional view of a display module according to still another embodiment of the present disclosure.

In an example, the display module according to the embodiments of the present disclosure may be a micro LED display device 170. Specifically, it may include a backlight module, which may be the backlight module according to any one of the above embodiments. For example, in the example shown in FIG. 17, the backlight module is the light source module 60 shown in FIGS. 7-10. The specific structure of the backlight module may refer to the description of the light source module in the above embodiments, which will not be repeated here. The micro LED display device may not include a liquid crystal display panel, and other structures thereof may refer to the structure of a conventional micro LED display device, and therefore they will not be described herein again.

Although some embodiments of the present disclosure have been illustrated and described, it should be appreciated by those skilled in the art that changes can be made to these embodiments without departing from the principle and spirit of the present disclosure, and the scope of the present disclose is defined by the claims and their equivalents.

What is claimed is:

1. A light source module, comprising:
   a substrate;
   a plurality of first light sources spaced on the substrate, each of the plurality of first light sources being configured to emit visible light;
   a depth sensor on the substrate; and
   a first blocking member configured to shield visible light but transmit invisible light,
   wherein the depth sensor comprises a second light source configured to emit invisible light, a light receiving member configured to sense invisible light, and a lens disposed at a side of the light receiving member away from the substrate, the light receiving member is spaced from the lens in a direction perpendicular to the substrate, an orthographic projection of the second light source on the substrate is located within an orthographic projection of a gap between two adjacent first light sources on the substrate, an orthographic projection of the first blocking member on the substrate at least partially covers the orthographic projection of the second light source on the substrate, and an orthographic projection of the lens on the substrate at least partially overlaps with an orthographic projection of the light receiving member on the substrate.

2. The light source module according to claim 1, wherein the second light source is disposed in the gap between the two adjacent first light sources.

3. The light source module according to claim 1, wherein an orthographic projection of the light receiving member on the substrate is located within the orthographic projection of the gap between the two adjacent first light sources on the substrate.

4. The light source module according to claim 3, wherein the light receiving member is located in the gap between the two adjacent first light sources.

5. The light source module according to claim 1, further comprising an optical film layer disposed at a side of the first light sources and the second light source away from the substrate, wherein the optical film layer comprises at least one of a diffusion sheet, a fluorescent layer, or a prism.

6. The light source module according to claim 5, wherein the lens is disposed at a side of the optical film layer adjacent to the substrate.

7. The light source module according to claim 5, wherein the lens is disposed at a side of the optical film layer away from the substrate.

8. The light source module according to claim 6, wherein the lens comprises a first side facing the light receiving member, and the first blocking member is disposed at sides of the lens other than the first side.

9. The light source module according to claim 7, wherein the lens comprises a second side away from the light receiving member, and the first blocking member is disposed at sides of the lens other than the second side.

10. The light source module according to claim 8, further comprising a second blocking member configured to shield visible light but transmit invisible light, and disposed at a side of the light receiving member adjacent to the first light sources.

11. The light source module according to claim 1, wherein the plurality of first light sources comprise light emitting diodes.

12. The light source module according to claim 11, wherein the light emitting diodes comprise micro light emitting diodes and/or mini light emitting diodes.

13. The light source module according to claim 1, wherein the first light sources, the second light source and the light receiving member are all located on a same side of the substrate.

14. The light source module according to claim 1, wherein the first light sources and the second light source are disposed on one side of the substrate, and the light receiving member is disposed on the other side of the substrate away from the first light sources and the second light source.

15. The light source module according to claim 1, wherein the substrate is a printed circuit board.

16. The light source module according to claim 1, wherein the light receiving member is disposed in a peripheral region of the substrate.

17. The light source module according to claim 1, wherein the second light source is configured to emit infrared light, and the light receiving member is configured to sense infrared light.

18. A display module, comprising the light source module according to claim 1.

19. A display module, comprising:
   the light source module according to claim 1; and
   a display panel on a light emitting side of the light source module, the display panel comprising:
   an array substrate;
   a color filter substrate opposite to the array substrate; and
   a liquid crystal layer between the array substrate and the color filter substrate, the liquid crystal layer comprising a first portion, an orthographic projection of the light receiving member on the substrate coinciding with an orthographic projection of the first portion of the liquid crystal layer on the substrate,
   wherein the first portion of the liquid crystal layer is configured in such a way that the first portion of the liquid crystal layer is deflected to form a lens in response to a depth imaging signal, so that light is focused on the light receiving member.

* * * * *